Patented Oct. 16, 1951

2,571,593

UNITED STATES PATENT OFFICE 2,571,593

PREPARATION OF STABLE LEUCO TOLUIDINE BLUE O SOLUTIONS

Bernice March, Chicago, and Edmond E. Moore, Waukegan, Ill., assignors to Abbott Laboratories, North Chicago, Ill., a corporation of Illinois No Drawing. Application October 16, 1950, Serial No. 190,438

4 Claims. (Cl. 260—243)

This invention relates to the process of preparing stable anti-heparin solutions, and more particularly to the process of preparing stable solutions of leuco Toluidine Blue O which have anti-heparin activity.

Commercial Toluidine Blue O is a rather impure product, containing only about 80% of the dye along with impurities, including certain heavy metals. Pure Toluidine Blue O has several therapeutic properties, but the known purification processes of the commercial product have tended to limit the applicability of the dye. The general laboratory method of purifying Toluidine Blue O is an alcoholic Soxhlet extraction, a lengthy procedure taking at least 24 hours and usually more.

Solutions of Toluidine Blue O have been found to be effective anti-heparin agents, however, the solutions have limited use due to the intense blue color, and the contamination of available Toluidine Blue O powder with heavy metals. The intense blue color is objectionable because it is not possible to inspect the solutions for freedom from foreign materials, which is important as the solutions are administered intravenously. The heavy metals found in the commercial product are deleterious impurities for intravenous injection. Furthermore, solutions of Toluidine Blue O often deposit a heavy precipitate in aging.

According to the present invention, we have discovered an efficient and practical method of preparing solutions of purified leuco Toluidine Blue O which have anti-heparin activity. Solutions of the leuco form of the dye not only retain therapeutic properties, but are clear, colorless to light-amber solutions. The solutions are stable, and are easily inspected for possible contamination. Generally, the solutions of the invention may be prepared by reducing solutions of Toluidine Blue O with sodium hydrosulfite while maintaining the solutions at an acid pH, and separating the precipitate which forms in the resulting leuco Toluidine Blue O solution.

In more specific detail, the following example illustrates the invention:

*Example*

About 100 cc. of boiled, cool water is saturated with carbon dioxide gas in a sealable container. About 1 g. of Toluidine Blue O, about 0.74 g. of sodium hydrosulfite, and about 0.2 cc. of concentrated hydrochloric acid is added to the water while carbon dioxide gas is bubbled therethrough during addition of the other ingredients. The container is then sealed and shaken until the blue color disappears. The solution is then aged until all the sodium hydrosulfite is broken down, at least about 24 hours, at room temperature. Decolorizing charcoal is then added to the solution, and the solution is filtered. The clarified solution is then filled and sealed into suitable containers under a carbon dioxide atmosphere.

The above example describes the preparation of a 1% leuco Toluidine Blue O solution, but 2%, 3% or higher may be prepared by doubling, tripling, etc., the amounts of the dye and the acid. The 1% solution is desirable, as the finished product is almost isotonic without addition of the other ingredients. It is preferable to use hydrochloric acid to obtain the acidic pH of the reaction, as resulting products are chlorides which are normally innocuous. However, other acids may be used in place of the hydrochloric acid.

The reduction is carried out at a pH low enough to prevent precipitation of dye, below pH 4, and preferably the reaction is maintained between pH 2.5 and pH 3.5. Good results in the reduction are obtained with a slight excess of the theoretical quantity sodium hydrosulfite required to reduce the dye, with a sufficient quantity of acid to maintain the reaction mixture below pH 4.

Others may readily adapt the invention for use under varying conditions of service, by employing one or more of the novel features disclosed, or equivalents thereof. As at present advised with respect to the apparent scope of our invention, we desire to claim the following subject matter.

We claim:

1. The process of preparing a stable anti-heparin solution which comprises adding sodium hydrosulfite to an acidic aqueous solution of Toluidine Blue O contaminated with heavy metals while maintaining the solution acidic, and then separating the precipitate that forms in the resulting leuco Toluidine Blue O solution.

2. The process of preparing a stable anti-heparin solution which comprises adding sodium hydrosulfite to a solution of Toluidine Blue O contaminated with undesirable heavy metals while maintaining the pH of the solution at less than about 4, and then separating the precipitate that forms in the resulting leuco Toluidine Blue O solution.

3. The process of preparing a stable antiheparin solution which comprises adding sodium hydrosulfite to an aqueous solution of Toluidine Blue O contaminated with heavy metals while maintaining the said solution at a pH of 2.5–3.5 with hydrochloric acid, and then separating the precipitate that forms in the resulting leuco Toluidine Blue O solution.

4. The process of preparing a stable antiheparin solution which comprises adding a slight excess of sodium hydrosulfite to an aqueous solution of Toluidine Blue O contaminated with impurities including heavy metals while maintaining the acidity of the solution at pH 2.5–3.5 with hydrochloric acid, allowing the resultant solution to set until the completion of the reaction, and filtering the precipitate from the resultant purified leuco Toluidine Blue O solution.

BERNICE MARCH.
EDMOND E. MOORE.

REFERENCES CITED

The following references are of record in the file of this patent:

UNITED STATES PATENTS

| Number | Name | Date |
|---|---|---|
| 1,996,867 | Herz et al. | Apr. 9, 1935 |
| 2,123,928 | Bousquet | July 19, 1938 |
| 2,451,082 | Gates et al. | Oct. 12, 1948 |